April 14, 1953  C. B. DALE  2,634,983
SPINDLE FOR PHONOGRAPH RECORDS
Filed June 19, 1950
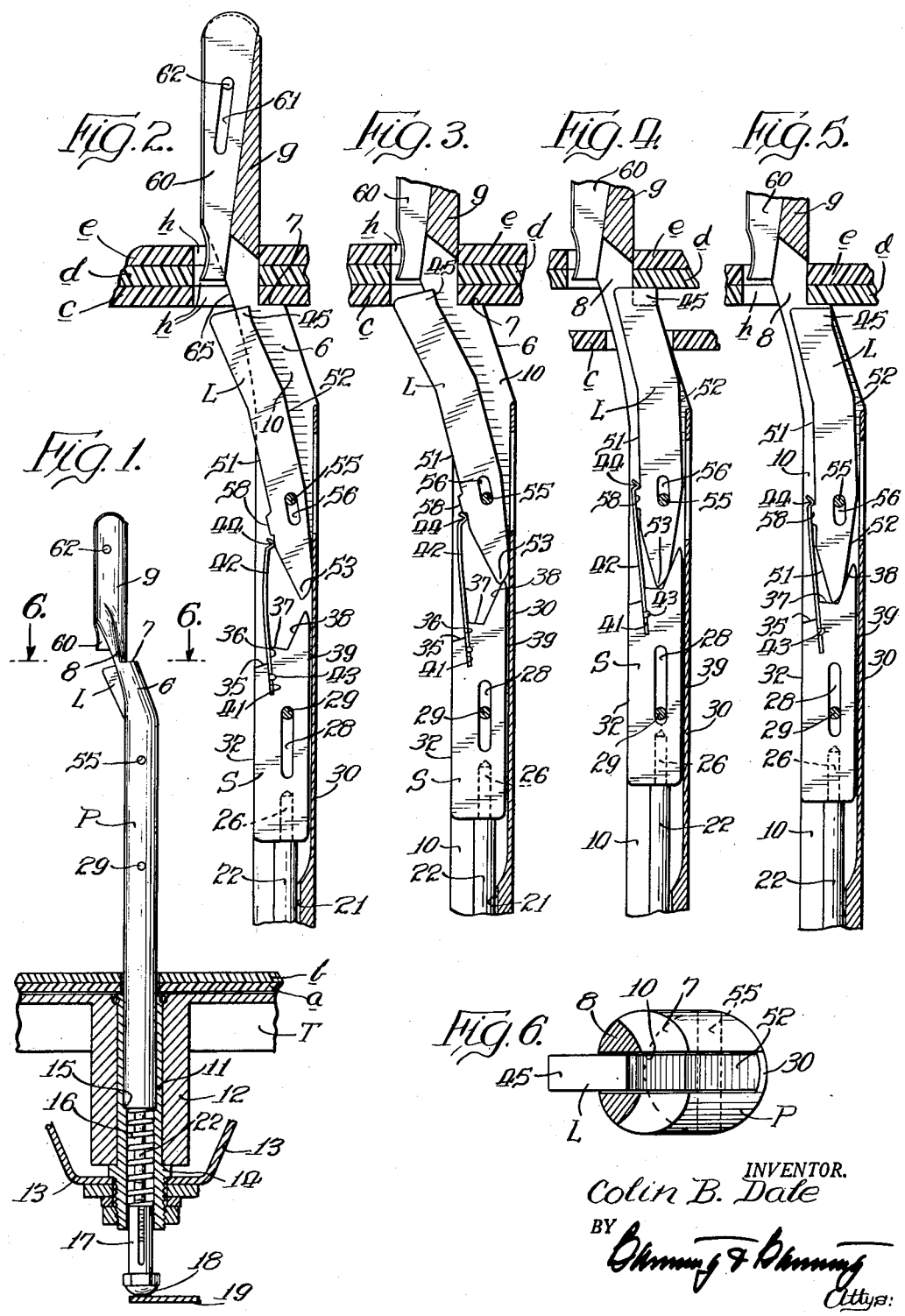
INVENTOR.
Colin B. Dale Patented Apr. 14, 1953

2,634,983

UNITED STATES PATENT OFFICE 2,634,983

SPINDLE FOR PHONOGRAPH RECORDS

Colin B. Dale, Oak Park, Ill., assignor to Webster-Chicago Corporation, Chicago, Ill., a corporation of Illinois Application June 19, 1950, Serial No. 168,887

2 Claims. (Cl. 274—10)

This invention relates to a spindle for supporting multiple disc records of a phonograph of the automatic record changing type. Associated with the spindle is any suitable mechanism, timed to operate at the conclusion of play of a record, for transmitting motion through the spindle to a push-off device which acts to release the lowermost record in the supported stack for gravity descent on to the turntable, or on to the topmost record that is already in position thereon.

The present spindle is of the type which provides in and of itself the main or only support for the stack of disc records which await successive release for gravity descent to playing position; it is furthermore of the type which embodies in its own construction the push-off means which periodically displaces the lowermost of the supported records in the stack from off a shoulder near the spindle top so that it may descend onto the turntable therebelow. Certain difficulties which have heretofore been commonly encountered in spindles of this and other types are overcome by the special features of improvement hereinafter noted.

There is provided at the top of the present spindle an offset pilot mounting an upwardly slidable pawl whose bottom overhangs the records therebelow but which recedes to a non-interfering position with upward movement of the records in the process of their removal from the spindle. The push-off device which is positioned wholly below this shoulder is operated by a rod extending axially through the spindle, and vertical movement thereof is translated into a four-way movement of the push-off device by means which is simple and effective for the purpose. The present spindle also includes means for preventing release of any record, but the one which is lowermost in the stack, whenever the periodic operation of the push-off device takes place.

All these objects and advantages, as well as others which will hereinafter appear, may be realized from a spindle construction embodying this invention of which one exemplification is illustrated in the accompanying drawing in the manner following:

Figure 1 is an elevational view of the spindle in its entirety, the associated phonograph turntable being shown in vertical section;

Figs. 2, 3, 4 and 5 are fragmentary vertical sectional views through the upper end portion of the spindle whereon is supported a plurality of records, these views illustrating the push-off mechanism in the first, second, third and fourth positions through which it proceeds in its operative cycle; and Fig. 6 is a transverse section, taken on line 6—6 of Fig. 1.

The present spindle is in the general form of a post P having in its upper region an inclined portion 6 where a horizontal shoulder 7 is provided oppositely of a neck 8 whereon is supported a vertically extending pilot 9. A kerf is disposed longitudinally of the spindle to provide a channel 10 which extends from the top of the pilot down to a point about opposite the turntable T through which the spindle is axially extended.

According to the assembly of Fig. 1, the lower end portion of the spindle is surrounded by a tubular bearing 11 around which is rotatably fitted a hub 12 depending from the turntable T; this bearing which is fixedly carried by a base platform 13 of the phonograph is provided with an annular shoulder 14 whereon the bottom end of the hub 12 is rested to be supported thereby. The lower end of the spindle is rested on a shoulder 15 that is provided within the bearing in position to receive engagement from the upper end of a coiled tension spring 16 which is accommodated within the bearing and maintained therein under compression by engagement with the upper end of a tubular nut 17 having a polygonal head 18 at its bottom end. This nut is convex on its under side to receive engagement from an operating means 19 which is actuated by the phonograph mechanism. This operating means may be a cam, lever, or other part to which motion is transmitted by the phonograph mechanism, and for convenience will be referred to hereinafter as the "actuator."

Within the lower end portion of the spindle below the channel 10 is an axial passageway 21 wherein is extended a push rod 22 whose lower end is in screw threaded engagement with the tubular nut 17. In response to motion transmitted by the actuator 19 the rod is advanced upwardly counter to the tension of the spring 16 which is effective to return the rod to its down position whenever permitted to do so by downward movement of the actuator.

Within the channel 10 is positioned a slide S whose cross section corresponds therewith, the slide having at its lower end a socket, disposed axially of the spindle, to receive the reduced upper end portion 26 of the push rod 22 and to be locked thereto by any appropriate means. The slide is also provided with a slot 28 elongated longitudinally of the spindle to receive therethrough a cross pin 29 which is anchored in the spindle. The slide is substantially in engagement with the spindle connecting wall 30 at the base of the channel 10, and because of the guiding function of the pin 29 within the slot 28 all movements of the slide will be confined to a straight vertical line.

The front face 32 of the slide near its upper end is inset to form a lower step 35 from which a riser 36 leads to a higher step 37 which is further inwardly disposed; from this point on upwardly there is provided an inclined cam face 38 extending from a point about axially of the spindle to the top of the slide adjacent its rear face 39 which lies close to the connecting wall 30 of the spindle. A kerf 41 which is aligned with the riser 36 is extended into the body of the slide to receive therein the lower end portion of a leaf spring 42 which is there anchored in place as by peening the slide at 43. This leaf spring extends upwardly within the channel 10 but wholly within the confines of the spindle, and at its upper end the spring is inwardly crimped to provide a contact head 44.

Positioned within the channel 10 above the slide S is a pivoted-sliding lever L having at its top a push-off head 45 which normally lies very slightly below the spindle shoulder 7 (see Fig. 2). This lever is angled outwardly slightly so that its push-off head 45 is normally disposed within the confines of the spindle pilot 9 thereabove, and of the center holes h of the several stacked records c, d, e, etc. that are carried on the spindle shoulder 7.

At the lower end of the lever L its front and rear faces 51 and 52 are inclined toward each other to meet angularly at the bottom where a rounded nose 53 is formed upon the rear face. A cross pin 55 which is anchored in the spindle traverses a slot 56 in the lever L, the slot being located in the lower end portion of the lever and being elongated in a generally vertical direction. This pin provides for the lever a mounting which is both sliding and pivotal. During each operating cycle of the push-off mechanism the nose 53 near the bottom of the lever is engaged by the cam face 38 of the slide S so as to be rocked to the position of Fig. 4. A sliding movement of the lever also takes place, as will hereinafter be explained in detail.

As shown, the lever is of generally rectangular cross section with its front face 51 exposed along the open side of the channel 10. Opposite the slot 56 a boss 58 is formed on the lever front face 51 at a point that is proximate to the contact head 44 of the spring 42. Opposite ends of this boss are in the form of slightly rounded shoulders with which the spring contact head 44 may successively engage (see Figs. 3–5). In the inactive position of Fig. 2 the spring contact head 44 is engaged with the lever front face 51 at a point below the boss 58 because there both the slide and lever are in down positions. The lateral pressure exerted by the spring against the lever is then at a point below the pivot pin 55, and in a direction which is transverse to that of the spindle axis. When both the slide and lever are in up positions (see Fig. 4), engagement of the spring contact head 44 with the lever L is at the upper end of the boss 58 at a point above the pivot pin 55.

The tension of the spring which is exerted horizontally against the lever accordingly alternates between points below and above its pivotal mounting. In particular this spring is relied upon to do three things: (a) when engaged with the lower shoulder of the boss 58, push the lever upwardly to the position of Fig. 3; (b) when engaged with the upper shoulder of the boss 58, pull the lever downwardly to the position of Fig. 5; and (c) when retracted below its pivotal mounting 55, rock the lever back to the position of Fig. 2. In each of these three movements, the encountered resistance is frictional, nothing else. Only when the push-off head 45 is in process of dislodging the lowermost record c from the shoulder 7 is any substantial resistance met with, and in this movement the slide and lever cammingly coact whereby to produce ample power for the purpose. The rear face 52 of the lever at its lower end is normally maintained against the connecting wall 30 of the spindle, its upper end portion being partly protruded outwardly from the spindle channel 10 to position the push-off head 45 directly below the pilot 9 and below the center holes h of the records supported thereabove. This is the normal inactive position of the operating parts.

The channel 10 which extends through the pilot 9 receives a pawl 60 having an elongated slot 61 traversed by a cross pin 62 whose ends are anchored in the pilot. The bottom wall of the channel in the pilot is inclined progressively to a point of maximum depth near the top of the pilot, and the pawl face in engagement therewith is inclined complementary thereto so that its opposite edge at the front remains parallel with the proximate face of the pilot. As a result the pawl will normally occupy a position wholly within the confines of the channel 10, as shown in Fig. 2, where the pawl is in its lowermost position with the cross pin 62 at the top end of the slot 61. The lower end portion of the pawl is then protruded outwardly in part from the front face 65 of the neck 8, the lower end of the pawl lying oppositely of the push-off head 45 of the lever L, and at an elevation above the shoulder 7 that is very slightly more than the thickness of a single disc record.

In operation, one or more records are fitted over the spindle, each with its center hole h receiving the pilot 9. A number of such records to form a stack may be successively placed upon the spindle and supported thereon by its shoulder 7 which engages with the under face of the lowermost record over a substantial area adjacent its center hole h. In Figs. 1–5 I have shown five such records, the one designated as a being rested on the turntable T, the record b being rested on the record a in playing position, and the records c, d, and e, held in reserve, being rested on the shoulder 7 ready for successive release and gravity descent upon the spindle to be stacked upon the records a and b already positioned on the turntable.

When the push-off mechanism is to proceed through its operating cycle, the actuator 19 imparts an upward thrust to the push rod 22 which transmits a corresponding motion to the slide S. The spring contact head 44 is thereupon caused to ride along the front face 51 of the lever L to engage the shoulder at the lower end of the boss 58, thereby to slide the lever upwardly to the position of Fig. 3 where the push-off head 45 is positioned within the hole h of the lowermost record c. This completes the first leg of the four-way movement cycle of the push-off mechanism. Continued movements of the slide and spring carried thereby produce only a rocking of the lever so that its push-off head 45 is shifted laterally to the position of Fig. 4. In this rocking movement the push-off head is required to shift the lowermost record c off of the shoulder 7 and free it for gravity descent along the spindle as indicated in Fig. 4. The lower end of the pawl 60 remains within the center hole h of the record d so as to prevent any lateral movement thereof when the record c is being displaced. While engaged in this operation the push-off head is also positioned immediately below the records d and e thereabove so as to afford therefor a temporary support until they can be lowered on to the spindle shoulder 7. This completes the second leg of the four-way movement cycle of the push-off mechanism.

At this point the push rod 22 begins its descent, and in so doing the slide and spring carried thereby are lowered, the spring contact head 44 then engaging the upper shoulder on the boss 58 to pull the lever down with it. In proceeding through this third leg of the movement cycle the records then supported on the push-off head are gently lowered for deposit upon the spindle shoulder 7, but the push-off head continues its downward movement to a point slightly below the shoulder 7, where it is halted by the pivot pin 55 coming into engagement with the top end of the slot 56. The slide, however, descends further in response to continued lowering of the push rod 22, and in so doing the contact head 44 of the spring rides down upon the boss 58 and therebelow where its tension force is exerted laterally upon the lever at a point below its pivotal mounting 55; concurrently, the step 37 and cam face 38 are pulling away from the nose 53 of the lever to free the latter for rocking movement, in response to tension of the spring, so that the push-off head 45 is advanced through the fourth leg of its movement cycle to a position directly below the pilot 9, as shown in Fig. 2. Here the operating cycle is completed, and the lever is back to its normal or inactive position where the push-off head 45 stands ready to repeat its four-way movement through the path just described in detail.

There is a novel and effective movement of the operating parts which cooperate to release each successive lowermost record on the spindle shelf. These parts are the slide which has capacity for vertical movement only and the lever which is mounted for both sliding and pivotal movements. At the commencement of the cycle the spring transmits an upward movement to the lever. The slide then exerts a camming force to rock the lever and displace a record for gravity descent. The slide then lowers, its spring thereby acting to draw the lever down with it. Finally, the slide, in pulling away from the lever, utilizes its spring to rock the lever back to its initial position where the spring continues to hold it. The transmission of motion to the lever, by which these movements through four successive paths are imparted thereto, involves a simple movement by the slide, a compound movement by the lever, and motion-transmitting forces imparted by the coacting spring and cam means which operate both singly and together in the special manner hereinbefore set forth.

I claim:

1. A record holding spindle for a phonograph turntable comprising a vertically extending hollow post having in its upper region a neck supporting an offset pilot, the spindle post being provided with a shoulder transversely of its axis in the neck region below the pilot to support thereon the lowermost apertured disc record of a stack aligned upon the pilot, means for displacing the lowermost record from the stack comprising a slide within the post and accommodated wholly within the confines thereof, means for guiding the slide in straight line movements axially of the post, a lever above the slide, a pivotal mounting for the lever within the post such that it is free for vertical sliding and pivotal movements therein, coacting cam means on the slide and lever for rocking the latter in one direction only, a spring carried by the slide exerting its tension force in a generally horizontal direction and engageable with the lever at successively spaced points on opposite sides of a line extending horizontally through its pivotal mounting for rocking the lever alternately in each direction, the lever being provided with a push-off head normally disposed below the record supporting shoulder, means protruding from the lever coacting with the spring and engageable thereby when the slide is upwardly advanced to transmit to the lever an upwardly sliding movement, the coacting cam means being thereafter engaged to rock the lever for shifting its push-off head laterally to displace from the shoulder the record supported thereon, and protruding means on the lever coacting with the spring and engageable thereby when the slide is first lowered to draw the lever down to a record disengaging position, the spring thereafter acting to return the lever back again to its initial position.

2. The combination with a spindle upstanding axially from a phonograph turntable, the spindle being formed in its upper end portion with a neck supporting a pilot and with a shoulder transversely of the spindle axis for support thereon of a plurality of stacked disc records each having a center hole through which the pilot is extended, and being formed also with an axial passageway through its lower end portion, and, in communication therewith, a channel extended lengthwise of the spindle through its upper end portion, of a push-rod mounted for reciprocal movements within the axial passageway, a slide within the spindle channel fixedly carried at the upper end of the push-rod for movements therewith, guide means confining movements of the slide to a straight line, tension means urging the push-rod slide assembly to a down position, a lever having at its top a push-off head and positioned within the channel above the slide, a pivotal mounting for the lever whereon it is free to slide vertically and rock about a horizontal axis to advance its push-off head through a four-way path starting from and ending with a position axially of and below the shoulder-supported record stack, and coacting means on the slide and lever for translating reciprocal movements of the former into sliding and rocking movements of the latter to advance its push-off head through the movement path aforesaid comprising a cam-step at the upper end of the slide and a coacting nose at the lower end of the lever interengaging sequentially when the slide is advanced upwardly to first rock the lever in one direction and later transmit an upward sliding movement to the lever, a spring carried by the slide in sliding engagement with the lever and exerting thereon a force transversely of the spindle axis at points alternately spaced below and above the lever pivotal mounting to effect alternate rocking movements thereof, and separable interengaging means extending horizontally from the spring and lever acting when the slide is moved either up or down to transmit a corresponding movement to the lever.

COLIN B. DALE.

References Cited in the file of this patent

UNITED STATES PATENTS

| Number | Name | Date |
| --- | --- | --- |
| 2,523,045 | Miller et al. | Sept. 19, 1950 |